No. 770,030. Patented September 13, 1904.

UNITED STATES PATENT OFFICE.

JEAN AUGUSTE TRILLAT, OF PARIS, FRANCE, ASSIGNOR TO LA SOCIÉTÉ DES CAVES ET DES PRODUCTEURS REUNIS DE ROQUEFORT, OF ROQUEFORT, FRANCE.

MANUFACTURE OF ROQUEFORT CHEESE.

SPECIFICATION forming part of Letters Patent No. 770,030, dated September 13, 1904.

Application filed May 27, 1904. Serial No. 210,060. (No specimens.)

*To all whom it may concern:*

Be it known that I, JEAN AUGUSTE TRILLAT, a citizen of the Republic of France, and a resident of Paris, France, have invented a new and useful Improvement in the Manufacture of Roquefort Cheese, which improvement is fully set forth in the following specification.

This invention relates to improvements in the manufacture of Roquefort cheese.

Up to the present time the method generally employed for manufacturing Roquefort cheese has consisted in sowing the curds of sheep-milk after the admixture of rennet with a powder that contains a large quantity of moldiness of the kind known as "penicillium," which is obtained by the pulverization of moldy bread peculiarly prepared therefor. After having been distributed in molds the curds are superficially sprinkled with powder of moldy bread contained in a box having a perforated lid. The parts of the sprinkled curds constitute the cheese to be refined. It may be seen that in this method of procedure the moldiness is confined in the inner part of the cheese. It thrives with time and produces the well-known blue vegetations which give to the Roquefort cheese its particular odor. This method presents some serious disadvantages, among which are the following: The distribution of the moldiness is unequal, and it is impossible that it could be otherwise. Indeed, whatever may be the attention given to distribution of the moldy bread upon the surface of the curds there are superficial portions which are unequally sown. There are some portions, for example, which receive quantities of spores a thousand times greater than other portions. The parts of the curds located outwardly toward the edge forming the joining of two portions of curds are not at all sown. The ramifications of the moldiness during the period of maturation begin at the central parts of the curds, and it follows that these parts are more forward than the outermost parts. This circumstance causes a lack of homogeneity, which is detrimental to the quality of the cheese. On the account of the powdering and the unequal distribution of the moldy bread there is always a certain amount of waste. This manner of sowing produces permanent dangers of contamination by foreign germs. All these disadvantages may be overcome by adopting the new method which I have found after long and laborious experiments.

The principles of the improved method essentially consist in sowing the milk before the admixture of a curdling agent instead of thereafter, as was done heretofore, in preparing a moldiness which perfectly mingles with the milk. I have discovered, and this may be verified by the examination with the microscope, that the spores of the penicillium distributed in the milk are carried away by the coagulation of the milk and that these spores are uniformly distributed in the coagulum which constitutes the curds; but for the good performance and the regularity of the operation it is necessary that the moldiness, which in the present case is formed by powder of moldy bread, (or by another kind of moldiness,) be uniformly distributed through the milk which is to be curdled. If powdered moldy bread is added to milk, the former floats on the surface on account of the fat materials contained in the same and also on account of the fat produced by the penicillium itself. Therefore it is necessary to submit the moldy bread to a certain preparation, which consists in a previous grinding with slightly-alkaline water for the purpose of extracting the fat materials. The powdered moldy bread which has been made free from fat in the manner stated above does not float. On the contrary, it closely mixes itself with the milk after a stirring of a few seconds. I have found, moreover, that this powder may be compressed without destroying the peculiar qualities of germination of the moldiness. In applying the result of these new observations I proceed as follows: The milk having been brought to the temperature at which the admixture of the rennet is effected, the powder of moldy bread is added, said powder having been previously diluted in milk in the proportion of one to two grams per one hundred liters of milk. The whole is stirred during some seconds, and then the admixture of the rennet is effected. Instead of sowing the moldiness in such a manner it may be done after the admixture of the rennet, when the milk is yet in a fluid state, immediately before the coagulation. After the curdling has been effected it is only necessary after the washing and sweating of the mass to put the same in suitable molds, and the process is complete. This method of procedure, as described above, is an efficient one for distributing the moldiness through the cheese, and the valuable industrial results due to the use of this method are numerous: (*a*) All parts of the curds are sown, while in the ordinary way the curds are only partially sown. (*b*) My improved method permits an exact and mathematical measurement of the moldiness in the cheese, this having been impossible with the previous method. The fermentation of cheese is more regular on account of the uniform distribution of the moldiness. The new method is more economical, inasmuch as a smaller quantity of moldy bread is required.

Having thus described my invention, what I claim, and desire to secure by Letters Patent, is—

1. The improvement in the manufacture of Roquefort cheese, which consists in sowing milk with mold-containing matter, and then curdling it by the admixture of a curdling agent.

2. The improvement in the manufacture of Roquefort cheese, which consists in sowing milk, prior to the curdling thereof, with moldy bread from which the fat has previously been extracted.

3. The improvement in the manufacture of Roquefort cheese, which consists in sowing milk, prior to the curdling thereof, with previously-compressed moldy bread in powdered form.

In testimony whereof I have signed this specification in the presence of two subscribing witnesses.

JEAN AUGUSTE TRILLAT.

Witnesses:
EMILE LEDRET,
HANSON C. COXE.